United States Patent
Wilbs

(10) Patent No.: US 9,668,578 B2
(45) Date of Patent: Jun. 6, 2017

(54) PROFILE ELEMENT FOR FURNITURE, IN PARTICULAR SHELVES

(75) Inventor: Thomas Wilbs, Uhlingen-Birkendorf (DE)

(73) Assignee: alfer aluminium Gesellschaft mbH, Wutoschingen (DE)

(*) Notice: Subject to any disclaimer, the term of this patent is extended or adjusted under 35 U.S.C. 154(b) by 404 days.

(21) Appl. No.: 13/472,277

(22) Filed: May 15, 2012

(65) Prior Publication Data

US 2012/0298822 A1    Nov. 29, 2012

(30) Foreign Application Priority Data

May 24, 2011  (DE) .......................... 10 2011 050 615

(51) Int. Cl.
| | | |
|---|---|---|
| E04C 2/52 | (2006.01) | |
| A47B 96/14 | (2006.01) | |
| E04B 2/74 | (2006.01) | |
| E04H 1/00 | (2006.01) | |
| E04H 3/00 | (2006.01) | |
| E04H 5/00 | (2006.01) | |
| E04H 6/00 | (2006.01) | |
| E04H 14/00 | (2006.01) | |
| A47G 29/02 | (2006.01) | |
| E04G 3/20 | (2006.01) | |
| E06B 7/28 | (2006.01) | |
| A47B 43/00 | (2006.01) | |
| A47B 47/00 | (2006.01) | |
| A47B 57/00 | (2006.01) | |
| A47B 21/06 | (2006.01) | |
| H02G 3/06 | (2006.01) | |

(52) U.S. Cl.
CPC ...... *A47B 96/1416* (2013.01); *A47B 96/1466* (2013.01); *A47B 21/06* (2013.01); *A47B 47/05* (2013.01); *A47B 57/06* (2013.01); *A47B 96/00* (2013.01); *A47B 96/068* (2013.01); *A47B 96/1441* (2013.01); *E04B 2001/2415* (2013.01); *E04B 2002/7462* (2013.01); *E04B 2002/7488* (2013.01); *H02G 3/0418* (2013.01); *H02G 3/0431* (2013.01); *H02G 3/0608* (2013.01)

(58) Field of Classification Search
CPC .. H02G 3/0418; H02G 3/0431; H02G 3/0608; H02G 3/14; H02G 3/081; H02G 3/0437; G02B 6/4459; A47B 96/1416; A47B 96/1408; A47B 96/14; A47B 96/1441; A47B 96/1433; A47B 96/1466; A47B 96/1475; A47B 2096/1491; A47B 96/068; A47B 47/05; A47B 47/0016; A47B 47/0025; A47B 47/0041; A47B 47/0058; A47B 47/0066; A47B 47/0083; A47B 47/02; A47B 47/025; A47B 4/028; A47B 47/03; A47B 47/045; A47B 21/06; A47B 57/06; E04B 2002/7488; E04B 2002/7462; E04B 2001/2415
USPC ....... 248/68.1, 74.1, 74.4, 74.5, 65, 49, 250, 248/235, 67.7, 73, 72; 211/26, 191, 192, 211/189, 187, 190; 52/36.5, 220.7, 239
See application file for complete search history.

(56) References Cited

U.S. PATENT DOCUMENTS 2,719,633 A * 10/1955 Rosenberg .................... 108/109
3,374,590 A * 3/1968 Kessler .............. E04F 13/0801
52/220.7

(Continued)

FOREIGN PATENT DOCUMENTS

BE        1016737        5/2007

*Primary Examiner* — Brian Mattei
*Assistant Examiner* — Taylor Morris
(74) *Attorney, Agent, or Firm* — Notaro, Michalos & Zaccaria P.C.

(57) ABSTRACT

The instant invention relates to a profile element for connecting plate-shaped elements, which are oriented orthogonally, parallel and in a line relative to one another, for constructing free-standing or wall-mounted, expandable storage furniture, in particular shelves.

12 Claims, 5 Drawing Sheets

(51) Int. Cl.
*H02G 3/04* (2006.01)
*A47B 96/06* (2006.01)
*A47B 57/06* (2006.01)
*A47B 96/00* (2006.01)
*E04B 1/24* (2006.01)
*A47B 47/05* (2006.01)

(56) References Cited

U.S. PATENT DOCUMENTS

| | | | | |
|---|---|---|---|---|
| 3,973,371 A * | 8/1976 | Heller | ................ | E04B 2/74 312/265.1 |
| 4,070,803 A * | 1/1978 | Gartung | ................ | A47B 57/42 108/108 |
| 4,086,978 A * | 5/1978 | Clements | ................ | 182/82 |
| 4,098,480 A * | 7/1978 | Neumann | ................ | 248/243 |
| 4,467,729 A * | 8/1984 | Featherman | ................ | A47B 57/16 108/107 |
| 4,501,402 A * | 2/1985 | Saito et al. | ................ | 248/346.02 |
| 4,825,612 A * | 5/1989 | Tupman | ................ | E04F 19/062 52/288.1 |
| 4,907,767 A * | 3/1990 | Corsi et al. | ................ | 248/49 |
| 5,024,614 A * | 6/1991 | Dola et al. | ................ | 439/114 |
| 6,055,912 A * | 5/2000 | Doud et al. | ................ | 108/110 |
| 6,076,322 A * | 6/2000 | D'Andrea | ................ | E04B 2/7854 52/220.2 |
| 6,479,747 B2 * | 11/2002 | Bellanger | ................ | 174/50 |
| 8,925,619 B2 * | 1/2015 | Frezouls | ................ | E04B 2/7433 160/135 |

* cited by examiner

PROFILE ELEMENT FOR FURNITURE, IN PARTICULAR SHELVES

The instant invention relates to a profile element for connecting plate-shaped elements, which are oriented orthogonally, parallel and in a line relative to one another, for constructing free-standing or wall-mounted, expandable storage furniture, in particular shelves.

Known wall-mounted or also free-standing shelves extend vertically either by means of a plurality of metallic, vertical wall fastening rails or individual vertical supports or vertical supports, which are connected to one another in pairs, made of wood or metal. Provision is made at these vertically running supports for a plurality of fastening possibilities for shelf board supports, which are spaced apart from one another, wherein the fastening possibilities are through holes or blind holes, the fastening sections of which engage with the shelf board supports. Shelf board supports can be simple steel pins, which are inserted into blind holes. Transferred to Cartesian coordinates, the height of the shelves corresponds to the z-axis, the width of the shelves corresponds to the x-axis and the depth of the shelves corresponds to the y-axis. The length of the shelf boards thus represents the extension of the shelves along the x-axis of a Cartesian coordinate system, the depth of the shelf boards represents the extension thereof along the y-axis. Typically, these shelves are open towards all sides of the room and the protection of the objects, which are placed onto the shelf boards, against dust or against falling down, is accordingly low. Such shelves can be expanded in x-direction, for the purpose of which the vertical supports oftentimes encompass double rows of the fastening possibilities.

The disadvantage of these shelves is the open design thereof, the lack of the possibility of a horizontal exposure close-off of the vertical supports in the case of embodiments, which are designed to be low, and the lack of lateral or rear exposure close-offs.

To propose a piece of storage furniture, which is completely closed off from the environment and which consists of only a few constructional elements, BE 1016737 A4 discloses a profile element for connecting plate-shaped elements, which are oriented orthogonally, parallel and in a line relative to one another, which can thus be arranged in x-, y- and z-direction. For this purpose, the described profile element is axially symmetrical and encompasses three accommodating pockets for a plate-shaped element in each case, which encompass the narrow sides thereof. Two of these accommodating pockets are arranged opposite to one another in a line and in each case perpendicular to the axis of symmetry. The third accommodating pocket is orthogonal to the first two accommodating pockets and is spaced apart from them. Through this, two plate-shaped elements can be arranged in a line so as to be aligned end-to-end in the first two accommodating pockets. The butt joint is formed by means of a thicker wall section of the known profile between the two accommodating pockets. A third plate-shaped element can be arranged in the third accommodating pocket at right angles thereto, so that for example a front/rear and a side wall results in the subsequent piece of furniture; the plate-shaped elements are thus located in the x-z plane and in the y-z plane. To be able to arrange a fourth plate-shaped element orthogonally to the first three elements, thus to obtain an adjustable shelf or a furniture top or bottom and thus an arrangement in the x-y plane, BE 1016737 A proposes configuration profiles comprising u-shaped cross sections, which must be connected to the profile element. This connection is carried out by means of their free, undulated legs, which can be snapped into correspondingly profiled holding pockets of the profile element. Through this, the configuration profiles comprising a u-shaped cross section form a bearing surface for adjustable shelves with their upper front edge. These configuration profiles are arranged between the first two accommodating pockets and the third accommodating pocket, so that the accommodating pockets must be spaced apart from one another accordingly. These configuration profiles are visible from the front side of the piece of furniture, wherein the first two accommodating pockets are partly covered by a highly curved view cover. The disadvantage of this state of the art is the constructively extensive and material-wasting design of the profile element as well as the fastening of the resulting piece of storage furniture by means of the profile elements on the wall, which is impossible due to the view cover of the profile element. Finally, it is also a disadvantage that this profile element can only be used as a vertical profile element.

It is thus the object of the instant invention to specify a profile element for connecting plate-shaped elements, which are oriented orthogonally, parallel and in a line relative to one another, for constructing free-standing or wall-mounted expandable storage furniture, in particular shelves, which avoids these disadvantages.

To solve this object, the invention proposes a profile element for connecting plate-shaped elements, which are oriented orthogonally, parallel and in a line relative to one another, for constructing free-standing or wall-mounted expandable storage furniture, in particular shelves, which encompasses a predominantly open cross section and at least a first, second and third flat attachment to the respective attachment of one or a plurality of plate-shaped elements, wherein two of the attachments are located in one plane and the third attachment is located in a plane, which is orthogonal thereto, wherein the third attachment encompasses two partial attachments, which are spaced apart from one another, wherein the distance of both partial attachments in mounted position corresponds to a thickness of a plate-shaped element, wherein the attachments are dimensioned such that plate-shaped elements having the same thickness can be guided along them, wherein the attachments are arranged so as to be spatially directly adjacent to one another at least in the mounted position, in particular encompassing common sections, wherein at least one attachment encompasses a plurality of through openings, wherein at least two, preferably four bars are arranged on one or both attachments, which are located in one plane, such that the free ends of the bars substantially point away from the third attachment, wherein provision is made for a plurality of shelf board supports, which encompass an engagement section for engaging with the through opening.

The cross section of the profile according to the invention, which is mainly open, leads to an advantageous saving of material, because only the walls, which are functionally required for guiding and holding the plate-shaped elements, must be available. The invention advantageously does without three-dimensional accommodating pockets and replaces them exclusively with flat attachments, which are sufficient to guide a plate-shaped element and to connect it to the profile element. The feature, which is required according to the invention, that the attachments are arranged directly spatially adjacent to one another at least in the mounted position, in particular encompassing common sections, has the same advantage of a saving of material. A profile element, which is comprised of two or more partial profile elements, which only form a uniform profile element after being connected to a plate-shaped element, also corresponds to the invention. According to the invention, the third attachment has two partial attachments, which are spaced apart from one another, which correspond to a thickness of a plate-shaped element, when in the mounted position. According to the invention, both partial attachments hereby do not need to be embodied equally or similarly, because a single surface is sufficient for guiding the element as in the case of the other attachments, but a necessary gap, which is always the same, of the plate-shaped elements, which are orthogonally perpendicular to one another, is ensured advantageously by means of the second partial attachment. The three attachments of the invention are dimensioned relative to one another via their surface expansion, material thickness and arrangement such that one element is guided at each attachment to the same extent. In other words, only elements having the same thickness and the same surface measures can be used for constructing a piece of storage furniture. Advantageously, the profile element according to the invention encompasses bars, which allow for a secure and simple fastening to a wall, without preventing an optically clean and low-injury close-off of the profile element towards an operating or use side.

In a further development of the invention, it is proposed that the profile element be embodied in one piece, in particular as an extruded aluminum profile, an extruded plastic profile or a cold roll formed steel profile. The one-piece design provides for a particularly simple and cost-efficient manufacture, storage and use, but according to the invention it is also possible to produce the functionally relevant components of the profile element individually and to fasten them to the other components only immediately prior to the furniture manufacture or to assemble them at the plate-shaped elements to form a functional whole in response to the furniture manufacture. This represents a further embodiment of the invention, according to which the profile element is embodied in several parts and the individual parts are connected to form a uniform profile in mounted position. The connection can thereby be made by means of screwing, snapping, gluing or the like. The attachments, for example, could hereby be embodied as profiles having an L-shaped or mainly u-shaped cross section.

Highly advantageously, the invention proposes for the profile element to encompass a wall thickness of 1.2 mm, preferably of 1.0 mm. Such a profile wall thickness is highly material-saving, but is chosen to be too small for the profile to be able to withstand the forces, which appear in the subsequent shelf, without being deformed. However, due to the fact that the profile is connected to plate-shaped elements, which are vertically upright in the z-y plane, the required bearing capacity according to a honeycomb structure follows from the sum of profile elements and plate-shaped elements.

As a further material-saving embodiment it is proposed that the attachments be embodied so as to be segmented in the direction of the longitudinal axis of the profile. To reach the necessary stability, attachment surfaces, which are continuously constant across the entire longitudinal expansion, are not required, because a plurality of attachment segments, which are connected to a plate-shaped element, also lead to a sufficiently stable connection, even if they should be connected to one another by means of sections having a smaller or lower attachment surface.

In an embodiment of the invention, provision is made for the bars to encompass a connection possibility on their free ends, to be embodied in particular in an angled manner, wherein the ends of the bars are located in a common plane. The bars are located on the exposed or front side of the assembled piece of furniture, or on the wall side thereof, respectively, in the case of the rear profiles. In the case of a wall mounting, they serve to support the profile against the wall, for the purpose of which the ends of all of the bars are located in the same plane, thus in a parallel plane to the plane of the first and second attachments. As do the attachments, the bars can also be embodied so as to have a continuous or segmented longitudinal profile axis. A bar would still be in accordance with the invention, even if it were embodied as a row of spaced apart cylinders or cuboids. In the event that the bars, which are understood in this manner, encompass a connection possibility, they can highly advantageously be used to support a cover profile, which covers them, which is desirable in particular on the exposed side of the subsequent piece of furniture, for safety reasons alone. Accordingly, the invention highly advantageously separates the functions of supporting/guiding and screening from view into two separate components. In the event that the bars are embodied so as to be angled, the effective wall bearing surface thereof is increased and the application of the holding force is thus increased advantageously. At the same time, the angled ends, which are in particular bent over by approximately 90°, can serve as connection possibility, for example as holding or snap noses, which are to be grasped. However, embodiments of the bar ends as ball heads or ball sockets are also possible according to the invention, so that ball joints, which can be snapped on, result as connection possibilities. Grooves in the bars, which serve as profiled accommodating pockets or for profiled bars, are further in accordance with the invention, so that locking connections, which can be snapped in, result between profile element and cover profile.

Provision is made in an embodiment of the invention for at least two bars to be embodied so as to be connected to one another in each case by means of a connection section. This leads to an even larger wall attachment surface in the case of profile elements, having a rearward arrangement and to an embodiment, which is optically closed and which is free from projecting ends, in the case of front side profile elements.

In the event that the spaces of the bars relative to one another and to the free end of a section are not equidistant, it is attained in an advantageous manner that, when designing the profile, they can be freely distributed across the surface, which is formed from first and second attachment, so as to be able to optimally transfer the forces, which appear in this manner. In particular, the bars are not arranged directly on the free end of an attachment, but they are slightly recessed, so that they ensure an optically clean and gap-free lateral closure of the profile element only together with the cover profile, which is fastened thereto. The position of the bars thus does not necessarily correspond to the position of the legs of the partial attachments of the third attachment.

In an embodiment of the invention, provision is made for it to encompass a cover profile comprising an exposed surface, as well as connection possibilities, which can be releasably connected to the connection possibilities of the bars. Even though, as has already been described, the separation according to the invention of cover profile and profile element initially leads to two parts, which must be produced separately, stored and connected to one another, which is generally disadvantageous, this separation has the advantage that a secure wall assembly as well as an operationally safe and optically appealing exposed side of the profile element is made possible.

In a particularly advantageous manner, the profile element according to the invention encompasses cable guides, which are releasably connected to the connection possibilities of the bars and which are arranged between the attachment and the cover profile. This provide for cable guides for electrical installations, which are covered and which are thus also operationally safe, in the subsequent piece of furniture, with the cables of said cable guide being easy to install due to the easy accessibility of the guide. Depending on the number and thickness of the cables, which are to be installed, they can be installed between the bars and the cable guide, which is to be fastened thereto, and can be covered by the cover profile after assembly has been completed and can thus be hidden from view. The cables thus run along the front side of the subsequent piece of furniture so as to be easily accessible underneath an easily removable cover, so that they can be installed or changed very easily.

The embodiment according to the invention, according to which a shelf board support in mounted position rests with its entire rear wall against the attachment and its rear wall and its support leg create an angle of greater than 90°, in particular 92° between one another is particularly advantageous. This angle has the result that the shelf board support is curved exactly perpendicular under load and thus holds the shelf board horizontally. It is thus more resistant than others. Such holohedral shelf board supports can be extruded easily; a complicated production via follow-on composite tools with successive stamping-bending steps is not required. At the same time, the large-surface support at the somewhat thin attachment wall does not lead to the deformation thereof or even to a severing, as it takes place in the case of the other known shelf board supports with the beveled small-surface supports thereof.

In the event that the shelf board supports abut holohedrally against the attachment and in the event that the engagement section thereof is embodied to be angled so as to result in an axis of rotation, which is located outside of the side view outline of rear wall and support leg, two things are realized advantageously: on the one hand, a user can easily grasp the shelf board support by one leg and can insert the engagement section thereof into the corresponding opening in the profile element, without his fingers striking against the attachment so as to be hindering. On the other hand, the axis of rotation, which is shifted backwards, and the rotation, which is required for the fastening, have the effect that once a shelf board support has been inserted, it cannot easily fall out of the through opening.

The invention will be described in an exemplary manner in a preferred embodiment with reference to a drawing, wherein further advantageous details can be found in the figures of the drawing.

Parts having the same function are thereby provided with the same reference numerals.

In detail,

Figure 1:
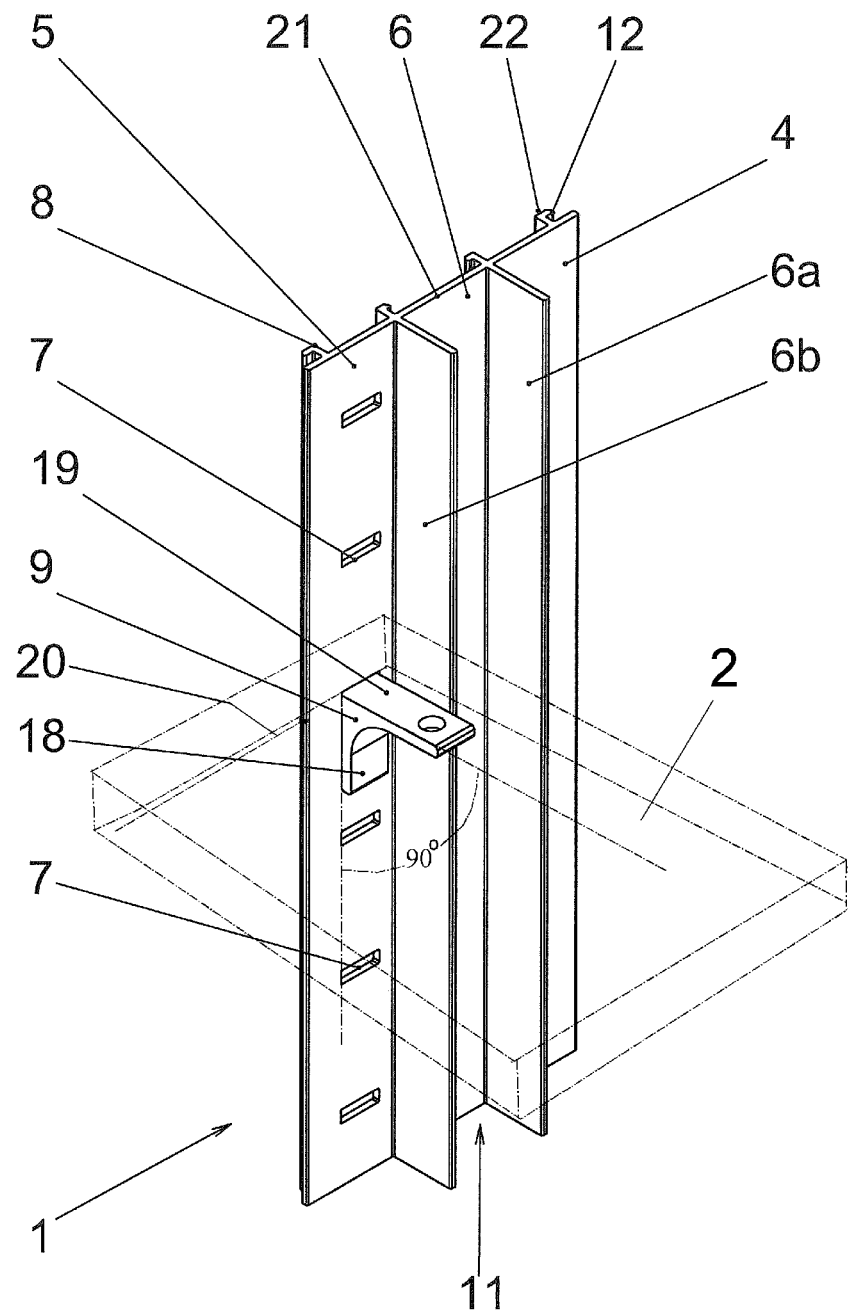
FIG. 1 shows a perspective view of an embodiment of a profile element.

FIG. 1 shows a profile element 1 according to the invention comprising an open cross section, which encompasses a first flat attachment 4, a second flat attachment 5 as well as a third flat attachment 6 and the axis of symmetry of which runs in the center between the two partial attachments 6a, 6b of the third flat attachment 6 in the connection piece 21. The first two attachments 4, 5 are located in a common plane, the third attachment 6 is perpendicular thereto. The three attachments 4, 5, 6 thus provide for a T-shaped arrangement of three plate-shaped elements and thus for an extension of the piece of furniture in x-z and y-z direction, thus in two of three spatial directions. In the case of this embodiment, which can be handled and manufactured in a particularly simple manner, all three attachments 4, 5, 6 are connected to one another, wherein the respective outer side of the two partial attachments 6a, 6b simultaneously serves as stop for a plate-shaped element, which is attached to the attachment 4 or 5, respectively. However, such embodiments, in the case of which two or more partial profile elements are put together at the plate-shaped element to form a uniform profile element directly prior to the assembly or only in response to the assembly, are also in accordance with the invention. The use of two L-profiles and one U-profile or one L- and one T-profile or one U- and one L-profile and more of these combinations, for example, would be possible here. Finally, the use of a mainly U-shaped profile would also be possible, the connection leg of which are guided beyond the attachment points of the free legs of the U-profile, so that the first and second attachment 4, 5 represent a type of guide bar at the connection piece 21 of the U-shaped profile. In this case, the shelf board supports point in the longitudinal direction of the shelf boards, they are thus arranged so as to be rotated by 90° as compared to the above-described embodiment. For reasons of clarity, the plurality of through openings 7, which are spaced apart and aligned to one another, is shown in FIG. 1 only for the attachment 5. According to the invention, such through openings are also provided in the first attachment 4 and in the connection piece 21, whereby the latter are preferably circular, because they are provided exclusively for connecting profile element and plate-shaped element and because they must thus be penetrated by fastening means, such as screws. FIG. 1 shows an inserted shelf board support 9, which holohedrally rests on the attachment 5 with its rear wall 18 and the support leg 19 of which extends away from it at an angle of approx. 91° to 93°, so that an accurate right angle forms only under load caused by shelf boards. As can be gathered from FIG. 3, the shelf board support 9 engages behind the attachment 5 with its engagement section 10. For the insertion, the shelf board support 9 is grasped at its rear wall leg 18, so that the engagement section 10 can be guided through the through opening 7 until the shelf board support 9 rests against the attachment with its support leg 19. The shelf board support 9 is subsequently rotated about its axis of rotation 20 and is moved downwards into the locked position. Plate-shaped elements can be arranged in the x-y plane, which is still missing, thus in the third spatial direction, by means of these shelf board supports, so that furniture bottoms or tops or shelving can be realized by means of this. Instead of one or a plurality of shelf board supports 9 or between them, respectively, plate-shaped elements can also be arranged at an attachment, as described. They thus form a rear wall between the shelf boards, for example. FIG. 1 also shows the bars 8 according to the invention, which extend away from the attachment 6 and the ends of which are bent over, so as to form a connection possibility 12 as well as a larger attachment surface 22, which, in the case of a wall mounting, comes to rest thereon. The outer two bars 8, which are farthest away from the axis of symmetry of the profile element, are bent over outwardly and are arranged so as to be slightly set back in the direction of the axis of symmetry. The two inner bars 8, which are arranged closer to the axis of symmetry, are bent towards one another and are located on the other side of the connection points of the partial attachments 6a, 6b to the adjoining attachment 4, 5 in this embodiment. The inner bars 8, however, can also easily be arranged closer to or farther away from the axis of symmetry than the connection points. Both can be chosen independent from one another when designing the profile element.

Figure 2:
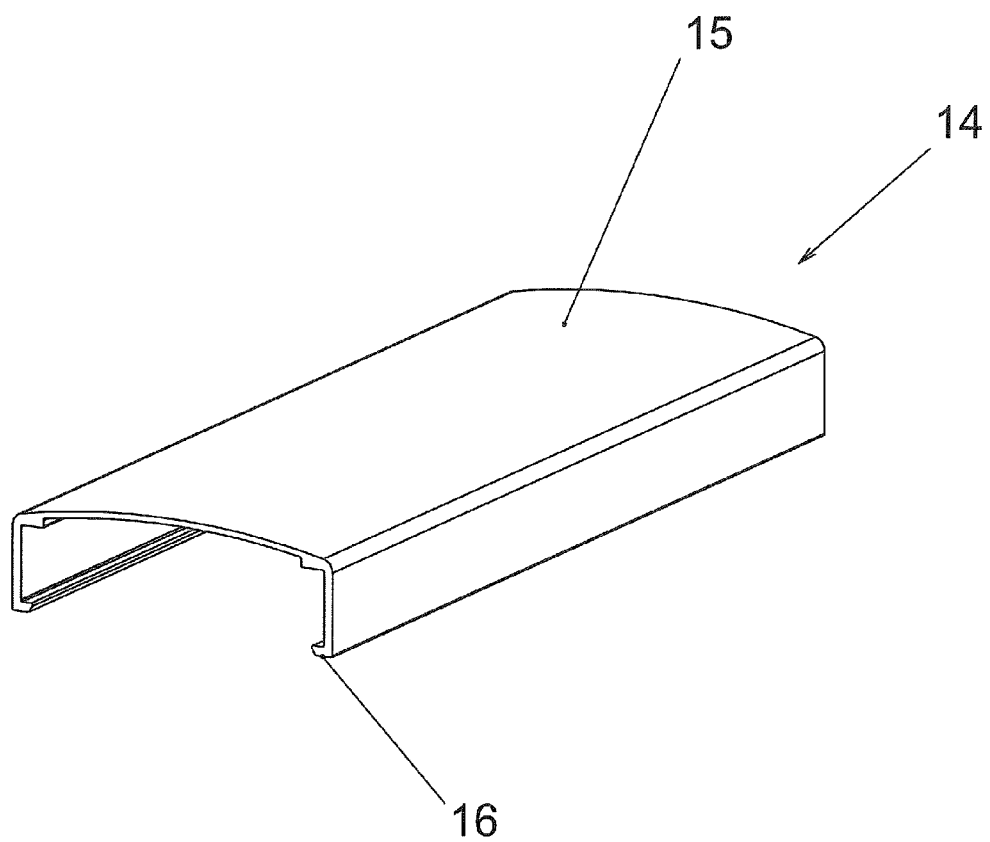
FIG. 2 shows a perspective view of a cover profile.

FIG. 2 shows a cover profile 14 comprising a bent exposed surface 15 and a connection possibility 16. The cover profile consists of extruded plastic or is an extruded aluminum profile. Provision can be made on the exposed surface 15 for decorative grooves or decorative projections. According to the invention, the surface can also be anodized or powder-coated or can be refined by means of inline web-fed printing. In the case of a plastic profile, it can be hot pressed. The connection possibilities 16, which correspond to the outer bars 8, are embodied herein as flexible wrap-arounds, wherein the distance between the wrap-arounds and the exposed surface can also be chosen to be smaller. This results in a thinner unit of profile element 1 and cover profile 14, which can always be desirable when there are no cables, which must be covered by the cover profile 14.

Figure 3:
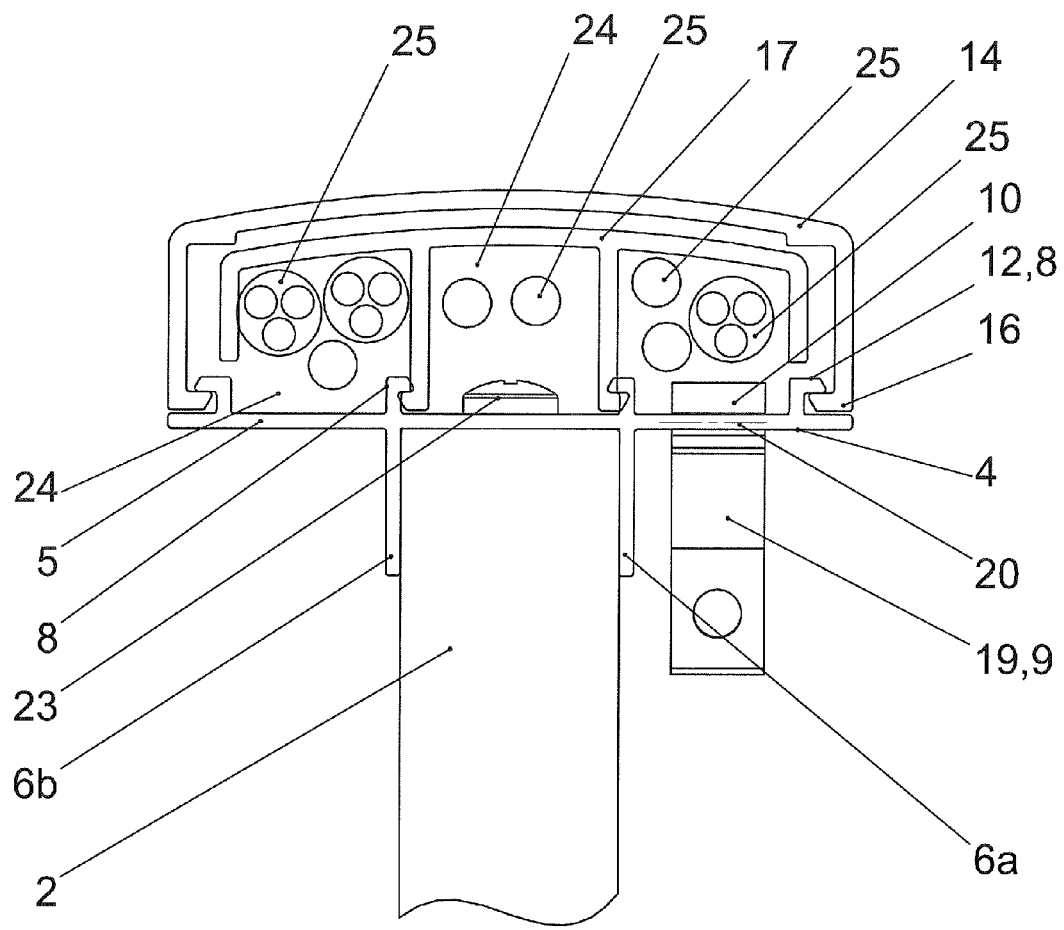
FIG. 3 shows a top view onto an assembled profile element.
Figure 4:
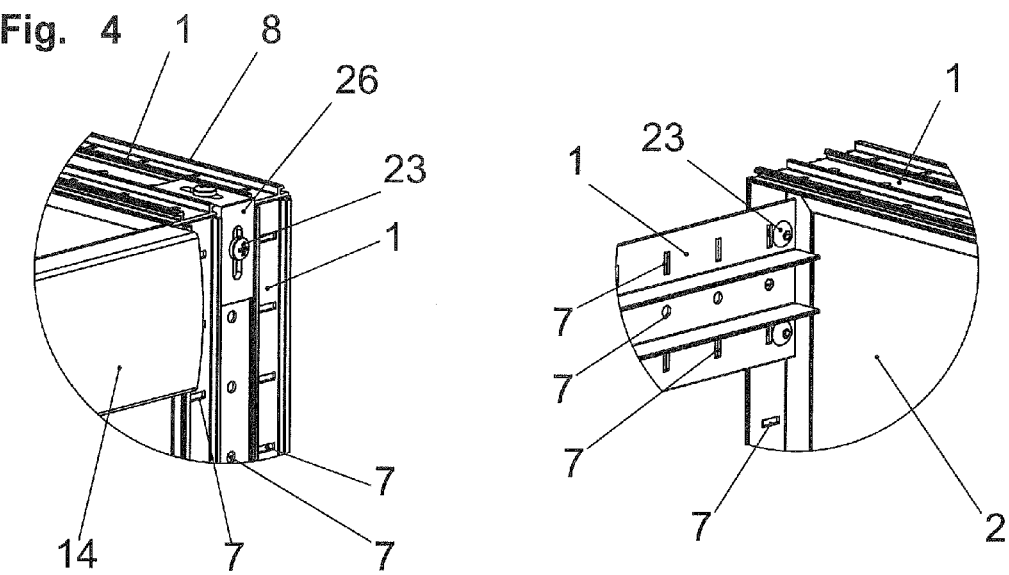
FIG. 4 shows a perspective view of a piece of furniture created from the profile element and FIG. 5 shows a further perspective view of a piece of furniture, which is created from the profile element.
Figure 4:
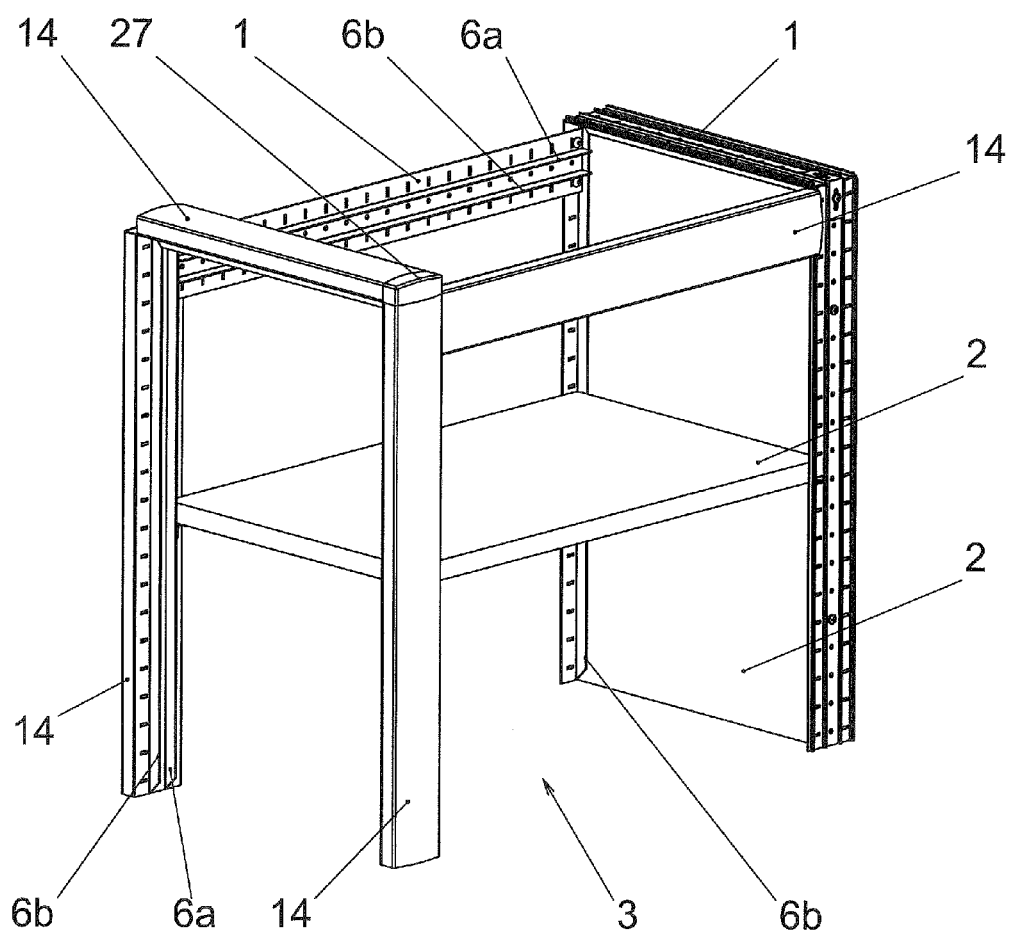

FIG. 3 shows a sketched cross section through a profile according to the invention in mounted position at a piece of furniture 3, as is illustrated more clearly in FIG. 4. A plate-shaped element 2 is accommodated in the third attachment 6 of the profile element 1 between the partial attachments 6a and 6b and is connected thereto by means of a screw 23 from the front side of the profile element 1. This connection increases the stability of the relative thin-walled profile, so that it can sufficiently support vertical loads. A shelf board support 9, which is also fastened to the attachment 4 and which engages behind the attachment 4 with its engagement section 10 such that the engagement section 10 is located above the bearing plane of the support leg 19 so that it is subjected to tensile loads and the rear wall 18, which is located below the drawing plane, is subjected to compressive loads can also be seen. A further plate-shaped element, which has been omitted for the sake of clarity, is arranged on the shelf support leg 19. It is supported by three further shelf board supports 9, which are arranged at the same height at three other profile elements 1. FIG. 3 shows the interaction of cover profile 14 and profile element 1, which are connected to one another at their respective connection possibilities 12, 16, in this embodiment by means of a snap-like grasping of the cover profile 14 around the ends of the outer bars 8, which are bent over. A mostly closed hollow space 24, which serves to guide one or multi-strand cables 25, thus results between cover profile 14 and profile element 1. Provision is made in the hollow space 24 for cable guides 17, which are snapped onto the inner bars 8. The cable guides 17 can thereby be short or longer profile sections, which can be displaced easily and continuously along the bars 8. The hollow space 24 is segmented by means of the cable guides 17, for example into three segments located next to one another. This is advantageous for the organized guiding of different cables for different purposes.

According to the invention, it is also possible to embody the bars 8 instead of the cover profile 14 to be longer, as is illustrated in FIG. 3, and to connect them to one another in pairs in each case. The bars 8 in FIG. 3 would accordingly run approximately along the legs of the cable guide 17, which was snapped in, and the respective outer leg can be connected to the corresponding inner leg. This results in a profile element comprising a partial screen from view onto the through openings 7. The round through openings 17, which are necessary for fastening the profile element to the plate-shaped element 2 by means of screws 23, would be exposed and thus accessible.

FIG. 4 finally shows, in three partial views. a piece of furniture 3 consisting of profile elements 1 and plate shaped elements 2 according to the invention, for example a small hip-height shelf.

It can be seen well that the profile elements 1 can be inserted vertically as well as horizontally and are simply connected to one another by means of screws 23 for this purpose. In the event of a corner connection from the vertical into the horizontal, as it is illustrated in the top left of FIG. 4, simple corner connectors 26 made of metal are used, which fix the profile elements 1 to one another. The profile element, which runs horizontally, can thereby be supported on the edge surfaces of the partial attachments 6a, 6b, thus resulting in a secure and fixed connection. In the event that the piece of furniture 3 is to be fixedly connected to a wall, this can be carried out easily by means of the through openings 7 of the rear profile elements 1, which are supported against the wall by means of their legs 8. In the area of the profile elements 1, front and exposed upper sides of the piece of furniture are covered by cover profiles 14, which can also be embodied so as to be flat in the case of the cross bracket 14'. In cooperation with the high cover profiles 14 of the vertical supports of the piece of furniture, this leads to an optically appealing pilaster effect. Where two cover profiles 14 meet, provision is made according to the invention for a corner connector 27, so as to cover open edges and to thus reduce the risk of injury.

It can also be seen well that stable side walls and shelf boards can be plate-shaped elements having the same thickness without any problems. FIG. 4 does not illustrate a rear wall of the piece of furniture, which, however, can easily be arranged between the shelf boards in the form of rear wall segments and which can be guided and fastened to the attachments of the profile elements. A furniture top can also be realized in a simple manner, in that the corresponding plate-shaped element is placed onto the upper partial attachment 6a and is fastened there. Due to the fact that the attachments 4, 5 and 6 are dimensioned equally, for example so as to encompass a depth of 16 mm, 18 mm or 19 mm and thus correspond to the commercial wooden board thicknesses, a single profile type and a single board thickness is sufficient to create highly flexible furniture, which, in the combination metal-wood, furthermore consists mainly of renewable raw materials so as to be optically appealing and ecologically sensible.

Figure 5:
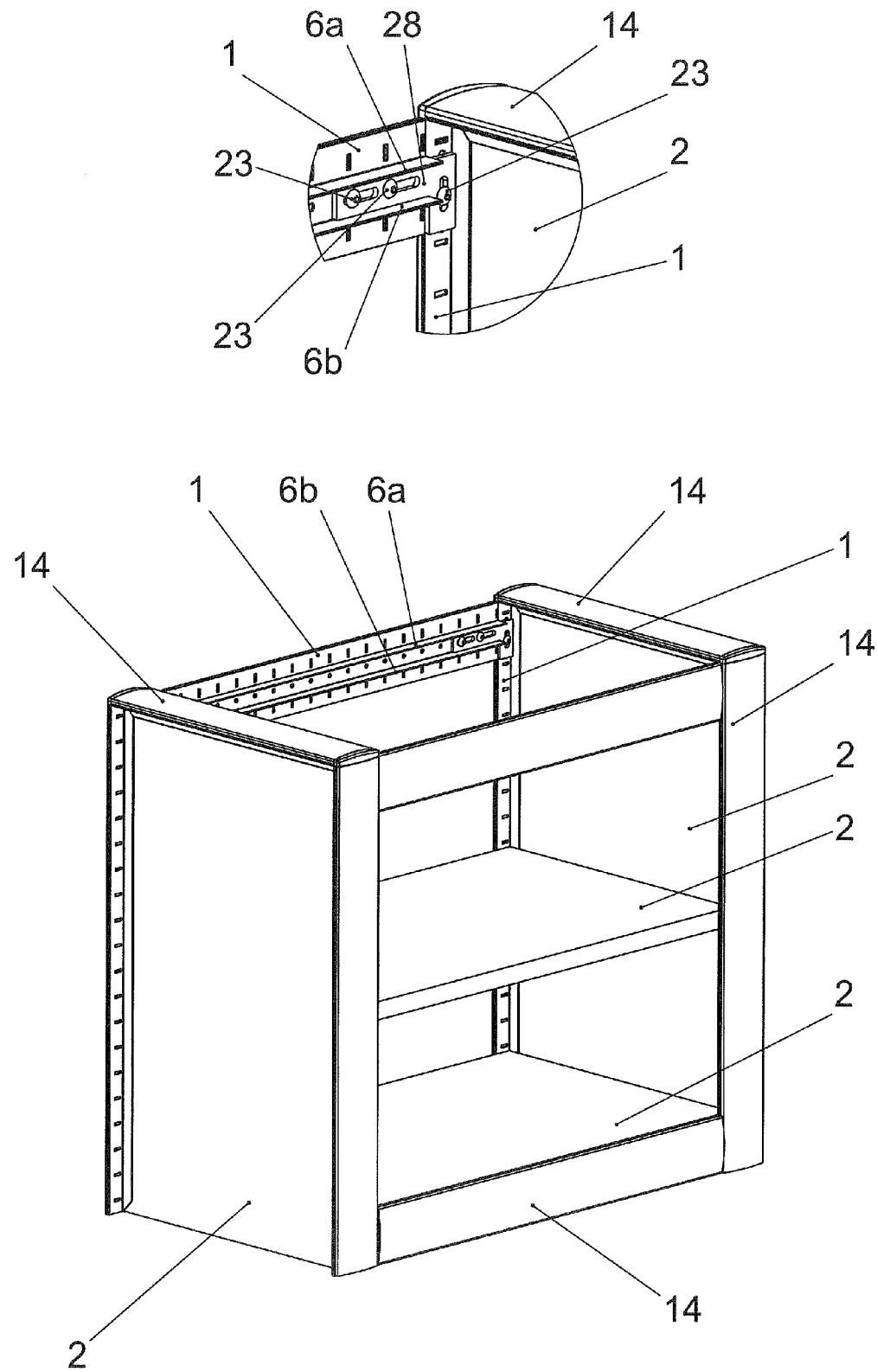

FIG. 5 shows a piece of furniture 3 comprising side walls, a bottom and a baseboard. A rear wall would be possible in the form of rear wall segments between the shelf boards or in the form of a continuous rear wall behind the profile rear sides. The detailed illustration of the connection of a vertical profile element 1 to a horizontal profile element 1 in the same plane by means of a specifically formed connection angle 28, which encompasses a plurality of elongated holes, is to be particularly emphasized. Such an offset-free connection has the result that the ends of all of the bars 8 are located in one plane and can thus be supported against a wall. On the exposed side of the piece of furniture, this simultaneously leads to cover profiles 14, which are located in one plane.

Due to its open cross section and the embodiment of the attachments as well as the separation of profile element and cover profile, the profile element according to the invention encompasses a high functionality, which makes it possible to not only use vertically running profile elements on furniture, but instead also horizontally running profile elements, so that an adequate furniture frame can be created, the spaces of which are closed by means of plate-shaped elements and which is designed in an optically appealing manner. Only a single type of profile element is required hereby, which can be inserted from the right or from the left, from the front or from the back and which can be covered, where necessary.

LIST OF REFERENCE NUMERALS 1 profile element
2 plate-shaped element
3 storage furniture
4 flat attachment
5 flat attachment
6 flat attachment
7 through openings
8 bar
9 shelf board support
10 engagement section
11 longitudinal axis
12 connection possibility
13
14 cover profile
15 visible surface
16 connection possibility
17 cable guide
18 rear wall
19 support leg
20 axis of rotation
21 connection piece
22 bearing surface
23 screw
24 hollow space
25 cable
26 corner connector
27 corner close-off
28 connection angle

The invention claimed is:

1. The combination of a profile element (1) and connected shelf boards (2), wherein shelf boards (2) are oriented orthogonally, parallel and in a line relative to one another, for constructing free-standing or wall-mounted, expandable storage furniture (3), formed of shelves, the profile element (1) having an open cross section and at least a first contact surface (4), a second contact surface (5) and a third contact surface (6) for respectively attaching shelf boards (2) whereby the shelf boards (2) are attached to one or more of the contact surfaces (4, 5, 6) of profile element (1), wherein the third contact surface (6) comprises two partial contact surfaces (6a, 6b) which are spaced apart from each other, wherein the first contact surface (4) and the second contact surface (5) are located in one plane and the two partial contact surfaces (6a, 6b) are each located in planes which are orthogonal to the first contact surface (4), and the second contact surface (5), and, wherein the distance between partial contact surfaces (6a, 6b) in mounted position are dimensioned to a thickness (d) of a shelf board (2), wherein the first, second and third contact surfaces (4, 5, 6) are dimensioned such that shelf boards (2) having the same thickness (d) can be guided along them, wherein the first, second and third contact surfaces (4, 5, 6) are arranged so as to be spatially directly adjacent to one another at least in the mounted position, in particular encompassing common sections, wherein a respective outer side of either of the two partial contact surfaces (6a, 6b) additionally serves as an abutment for a shelf board which is attached to either first and second contact surfaces (4) or (5) in an assembled status, wherein at least one of the first, second or third contact surfaces (4, 5, 6) encompasses a plurality of through openings (7), wherein at least two, bars (8) are arranged on a surface opposite to the surface of said first and second contact surfaces (4, 5, 6) on which the partial contact surfaces (6a, 6b) are located, wherein a plurality of shelf board supports (9), which encompass an engagement section (10) for engaging with the through openings (7) are present, wherein the profile element (1) is embodied as an extruded aluminum profile or a cold roll formed steel profile.

2. The combination of a profile element (1) and shelf boards (2) according to claim 1, characterized in that the profile element (1) is embodied in one piece.

3. The combination of a profile element (1) and shelf boards (2) according to claim 1, characterized in that the profile element (1) is embodied in several parts and in that the individual parts in mounted position are connected to form a uniform profile.

4. The combination of a profile element (1) and shelf boards (2) according to claim 1, characterized in that the profile element (1) encompasses a uniform wall thickness of 1.2 mm, preferably of 1.0 mm.

5. The combination of a profile element (1) and shelf boards (2) according to claim 1, characterized in that contact surfaces (4, 5, 6) are embodied so as to be segmented in the direction of the longitudinal axis (11) of the profile.

6. The combination of a profile element (1) and shelf boards (2) according to claim 1, characterized in that the bars (8) encompass a connection possibility (12) on their free ends, in particular being embodied in an angled manner, wherein the ends of the bars (8) are located in a common plane.

7. The combination of a profile element (1) and shelf boards (2) according to claim 1, characterized in that at least two bars (8) are embodied so as to be connected to one another by means of a connection piece (21).

8. The combination of a profile element (1) and shelf boards (2) according to claim 1, characterized in that the distances of the bars (8) relative to one another and to a free end of either the first and second contact surface (4, 5) are not equidistant.

9. The combination of a profile element (1) and shelf boards (2) according to claim 1, characterized in that it encompasses a cover profile (14) comprising an exposed surface (15), and connection possibilities (16), which can be releasably connected to connection possibilities (12) of the bars.

10. The combination of a profile element (1) and shelf boards (2) according to claim 1, characterized in that it encompasses cable guides (17), which are releasably connected to connection possibilities (12) of the bars and which are arranged between the contact surface (4, 5) and a cover profile (14).

11. The combination of a profile element (1) and shelf boards (2) according to claim 1, characterized in that a shelf board support (9) in mounted position rests with an entire rear wall (18) against the contact surface (4, 5) and its rear wall (18) and a support leg (19) create an angle of 90° under load conditions.

12. The combination of a profile element (1) and shelf boards (2) according to claim 1, characterized in that shelf board supports (9) comprise a rear wall (18) and a support leg (19) and said shelf board supports (9) abut holohedrally against either or both the contact surfaces (4, 5) and the engagement section (10) thereof is embodied to be angled so as to result in an axis of rotation (20), which is located outside of a side view outline of the rear wall (18) and the support leg (19).

\* \* \* \* \*